United States Patent
Gaggara et al.

(10) Patent No.: US 8,774,179 B1
(45) Date of Patent: Jul. 8, 2014

(54) MEMBER LINK STATUS CHANGE HANDLING FOR AGGREGATE INTERFACES

(75) Inventors: Siva Gaggara, Sunnyvale, CA (US); Nitin Kumar, Fremont, CA (US); Fritz Budiyanto, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1389 days.

(21) Appl. No.: 12/016,740

(22) Filed: Jan. 18, 2008

Related U.S. Application Data

(60) Provisional application No. 60/885,787, filed on Jan. 19, 2007.

(51) Int. Cl.
*G01R 31/08* (2006.01)
*H04L 12/28* (2006.01)
*H04L 12/56* (2006.01)
*H04L 12/46* (2006.01)

(52) U.S. Cl.
CPC ............. *H04L 45/245* (2013.01); *H04L 47/41* (2013.01); *H04L 12/4695* (2013.01); *H04L 47/827* (2013.01)

USPC .......................... 370/389; 370/248; 370/252

(58) Field of Classification Search
None
See application file for complete search history.

(56) References Cited

U.S. PATENT DOCUMENTS 7,151,774 B1 * 12/2006 Williams et al. ............... 370/392
2002/0034187 A1 * 3/2002 Kalkunte et al. .............. 370/401

* cited by examiner

*Primary Examiner* — Faruk Hamza
*Assistant Examiner* — Thinh Tran
(74) *Attorney, Agent, or Firm* — Shumaker & Sieffert, P.A.

(57) ABSTRACT

A method is provided for handling member link state changes in an aggregate interface. An aggregate interface may be established to include a number of member links. A mask may be associated with the aggregate interface, where the mask identifies a current state of each member link in the aggregate interface. The mask is retrieved and used to identify active links in the aggregate interface when packets are received for forwarding on the aggregate interface.

13 Claims, 6 Drawing Sheets

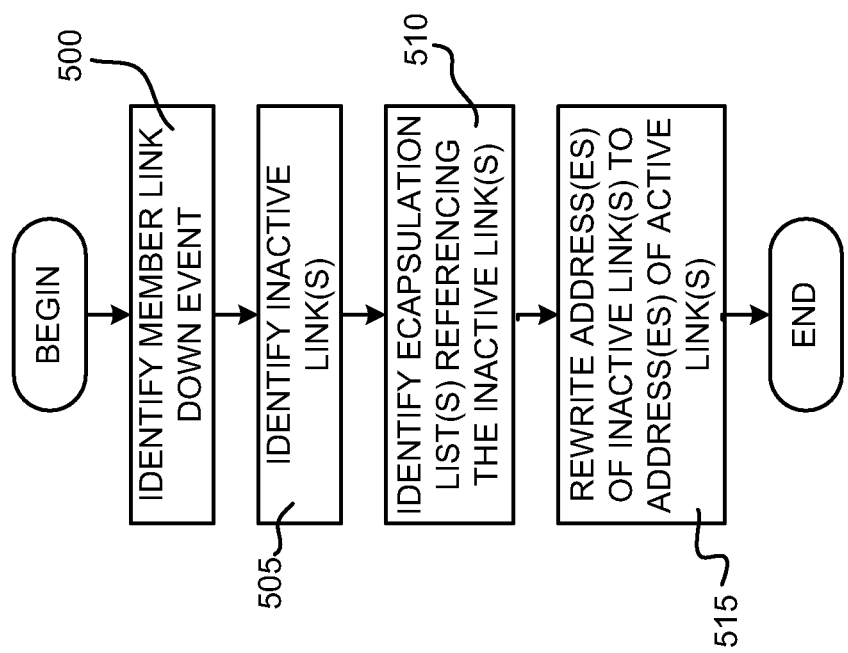

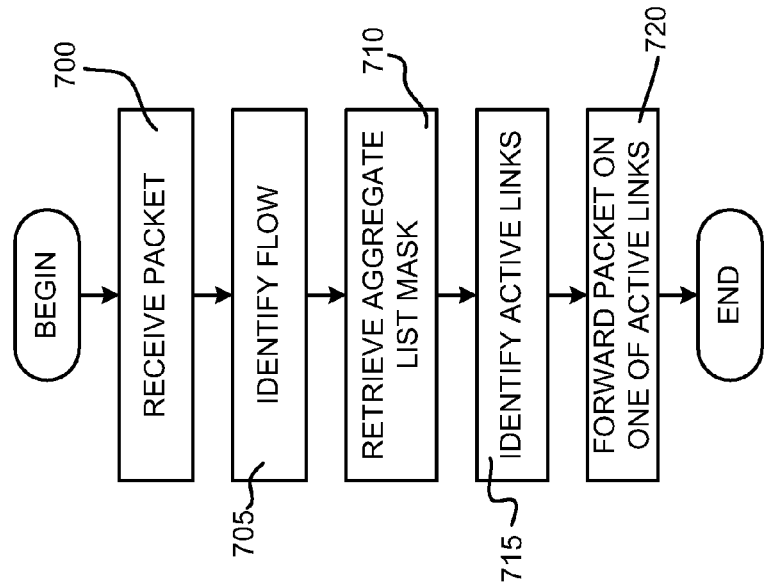
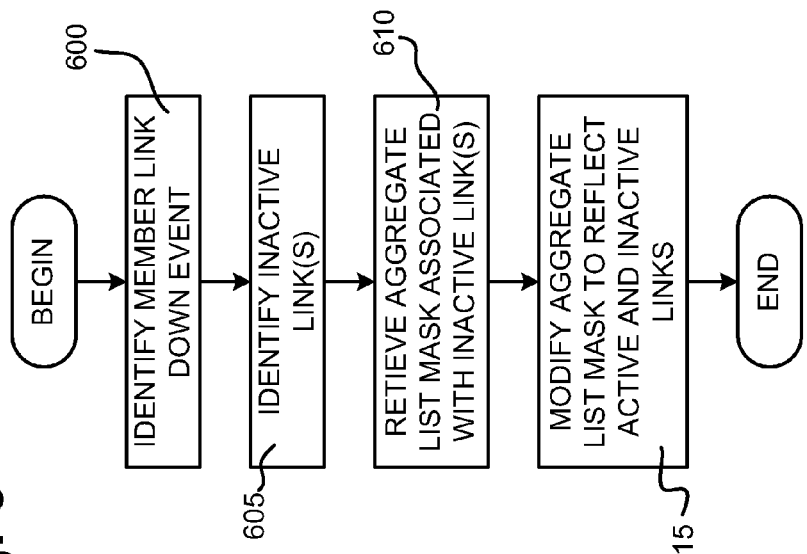

US 8,774,179 B1

MEMBER LINK STATUS CHANGE HANDLING FOR AGGREGATE INTERFACES

RELATED APPLICATION

This application claims priority from U.S. Provisional Application No. 60/885,787, filed Jan. 19, 2007, entitled "MEMBER LINK STATUS CHANGE HANDLING FOR AGGREGATE INTERFACES", the content of which is hereby incorporated by reference.

BACKGROUND OF THE INVENTION

A. Field of the Invention

Concepts described herein relate generally to interface aggregation, and more particularly, to enhancing performance of an aggregated interface upon failure of a member link.

B. Description of Related Art

In an increasingly networked world, more and more traffic, such as data, voice, and video, is transmitted over public and proprietary networks. In most networks, a networking device, such as a switch or router, receives data packets from a number of ingress ports connected to the networking device and provides the data packets to a number of egress ports connected to the networking device. The networking device typically determines the proper egress port to which the data packets are forwarded based on several elements, including the destination address included in the data packet.

In a traditional networking model, a destination device is connected through one physical link to one egress port in the networking device. A data packet received at an ingress port for the destination is forwarded through the networking device to an identified egress port. The destination device may be a computer, a switch, or a router.

To increase bandwidth available on the network, as well as the reliability and performance of the network, the destination device may be connected to more than one egress port through multiple physical links with each physical link terminating at an egress port. The multiple physical links are members of a logical link, (referred to as an "aggregate interface"), between the networking device and the destination device.

For each packet or message that must pass between the two communication devices, the sending communication device selects one of the member links of the aggregated interface to receive the packet or message. In some instances the selection of a particular member link may be made based on a predetermined load balancing technique, such as a round robin or weighted round robin approach, to ensure that each member link carries a proportionate share of the network traffic.

One problem with known link aggregation techniques relates to the efficient handling of member link failures. Without rapid identification and isolation of inactive member links, data may be improperly forwarded to an in inactive link in the aggregate interface, resulting in data loss.

SUMMARY

In one aspect, a method may include establishing an aggregate interface to include a number of member links. A mask may be associated with the aggregate interface that identifies a current state of each member link in the aggregate interface.

In another aspect, a method may include identifying an inactive link among a number of member links in an aggregate interface; identifying a list referencing the aggregate interface, where the list includes link addresses for each member link in the aggregate interface; and rewriting an address in the list associated with the inactive link to an address in the list associated with an active link.

Another aspect is directed to a network device including a packet forwarding engine configured to receive a data unit for forwarding on an aggregate interface including a number of member links. An encapsulation component may be configured to retrieve a mask associated with the aggregate interface identifying a current state of each member link in the aggregate interface. The encapsulation component may be further configured to identify an active member link in the aggregate interface based on the mask. A load balancing component may be configured to forward the data unit on the identified active member link.

According to yet another aspect, a network device may include logic configured to: receive a packet; identify a flow associated with the packet, where the flow designates a mask address and a list address associated with an aggregate interface; retrieve a mask from the mask address that includes state identifiers indicating a current state of each member link in the aggregate interface; retrieve a list from the list address based on the mask, where the list includes addresses for active links identified in the mask; and forward the packet to an active link address identified in the list.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is a flow diagram illustrating one exemplary set of acts that may be performed in responding to a member link down event;

FIG. 6 is a flow diagram illustrating another exemplary set of acts that may be performed in responding to a member link down event; and FIG. 7 is a flow diagram illustrating one exemplary set of acts that may be performed in forwarding packets on the aggregate interface of FIG. 1.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, member links of an aggregate interface may be dynamically modified to reduce the likelihood of data loss in the event of a member link down event. More specifically, in one implementation, an encapsulation list referencing the member links may be modified to remove references to an inactive link. In another implementation, a mask including link state identifiers may be initially retrieved to ensure accurate identification of active links in the aggregate interface.

Exemplary System Overview

Figure 1:
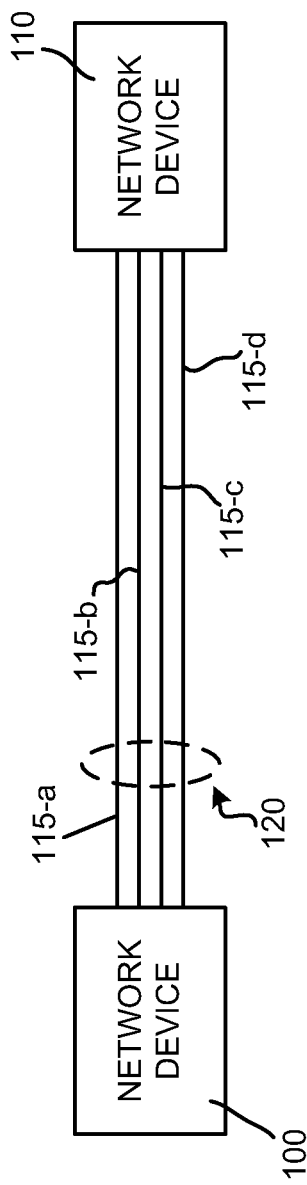
FIG. 1 is a block diagram illustrating an exemplary network configuration in which implementations described herein may be found.

FIG. 1 is a block diagram illustrating an exemplary network configuration including a first network device 100, a second network device 110, and a number of links 115*a* through 115*d* (collectively, "links 115") for transmitting data between devices 100 and 110. Links 115 may be configured to form member links 115 of an aggregated interface 120 for transmitting data between devices 100 and 110. In one exemplary implementation, one or both of devices 100 and 110 may include network routers or switches configured to pass data between each other. Alternatively, devices 100 and 110 may form other types of host devices, such as a server or a personal computer.

Although devices 100 and 110 are schematically illustrated as including a single aggregated interface 120 including four member links, it should be understood that devices 100 and 110 may support any suitable number of links and aggregated interfaces.

Figure 2:
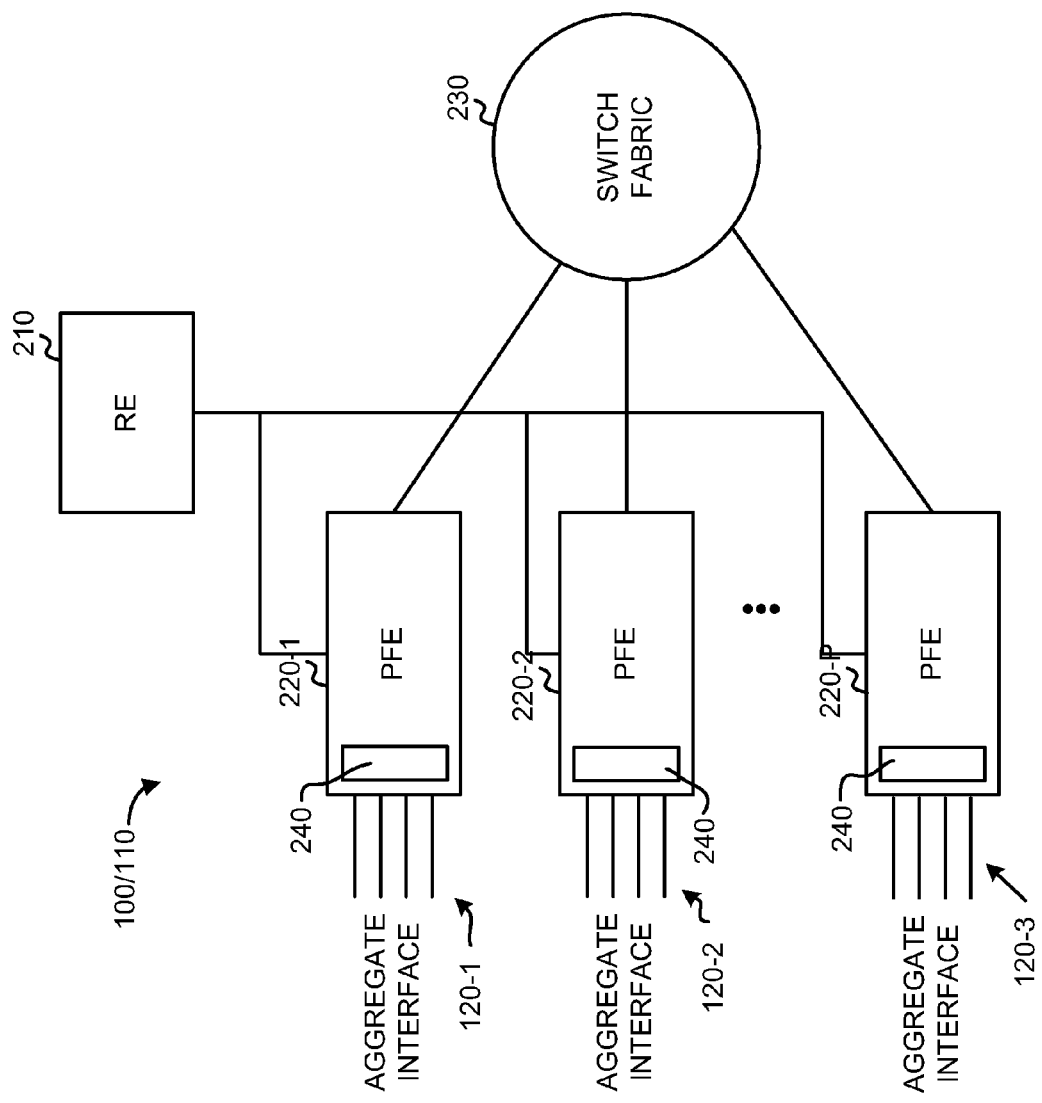
FIG. 2 is a block diagram illustrating an exemplary embodiment of a network device as shown in FIG. 1.

FIG. 2 is a block diagram illustrating an exemplary embodiment of a network device 100/100. Device 100/110 receives one or more packet streams from physical links, processes the packet stream(s) to determine destination information, and transmits the packet stream(s) out on links in accordance with the destination information. Device 100/110 may include a routing engine (RE) 210, packet forwarding engines (PFEs) 220-1 through 220-P (collectively referred to as PFEs 220), and a switch fabric 230.

RE 210 may perform high level management functions for system 100. For example, RE 210 may communicate with other networks and systems connected to system 100 to exchange information regarding network topology. RE 110 may create routing tables based on network topology information, create forwarding tables based on the routing tables, and forward the forwarding tables to PFEs 220. PFEs 220 may use the forwarding tables to perform route lookup for incoming packets. RE 210 may also perform other general control and monitoring functions.

PFEs 220 may each connect to RE 210 and switch fabric 230. As described above, device 100/110 may include one or more aggregate interfaces 120 (illustrated in FIG. 2 as aggregate interfaces 120-1, 120-2, and 120-3), each of which may include a number of physical links Each aggregate interface 120 appears as a single virtual interface to switching fabric 130 and RE 110. PFEs 120 may receive packet data on aggregate interface 120 connected to a network, such as a wide area network (WAN) or a local area network (LAN). Each physical link 115 within aggregate interfaces 120 could be one of many types of transport media, such as optical fiber or Ethernet cable. Additionally, the data on each physical link may be formatted according to one of several protocols, such as the synchronous optical network (SONET) standard, an asynchronous transfer mode (ATM) technology, or Ethernet. The data may take the form of data units, where each data unit may include all or a portion of a packet.

In one implementation consistent with aspects described herein, device 100/110 may use encapsulation lists 240 to facilitate identification of member links 115 in aggregate interface 120 as well as to append encapsulation information (e.g., encapsulation strings) onto received packets prior to forwarding on interface 120. In one embodiment, each encapsulation list 240 may include a listing of encapsulation identifiers for each member link 115.

In one implementation, each encapsulation list 240 include listings of encapsulation identifiers that may be used by may be used to either a different chip or a different piece of logic within the same chip to perform packet encapsulation within a link level header, etc.

It should be understood that although only a single encapsulation list 240 is depicted in FIG. 2 as being associated with each aggregate interface 120, multiple encapsulation lists 240 may point to a single aggregate interface 120 to support, for example, different encapsulation strings (e.g., MPLS labels) for different types of packets or flows.

Figure 3:
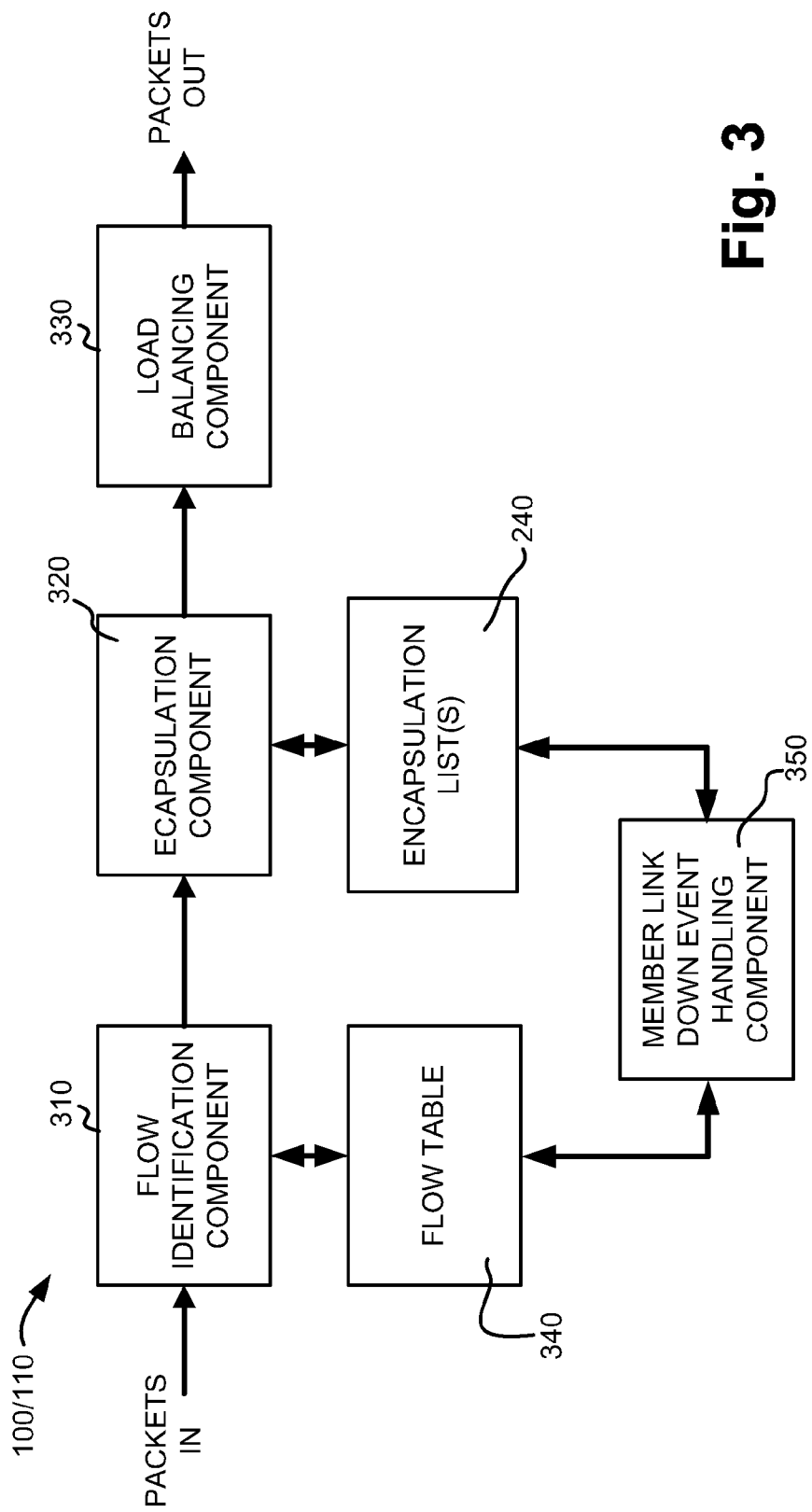
FIG. 3 is a diagram conceptually illustrating exemplary components for balancing load between member links in the aggregated interface of FIG. 1.

FIG. 3 is a diagram conceptually illustrating exemplary components for balancing load between member links 115 in aggregated interface 120. In practice, the elements shown in FIG. 3 may be implemented in, for example, a router, switch or other network device, such as within a PFE 220.

As shown in FIG. 3, the device 100/110 may include a flow identification component 310, an encapsulation component 320, a load balancing component 330, a flow table 340, and a member link down event handling component 350. In general, these components may act to identify a flow associated with an incoming packet, identify an encapsulation list and aggregate interface associated with the flow, append any encapsulation information identified in the encapsulation list to the packet and forward the packet to a member link identified in the encapsulation list based on a load balancing algorithm. Although bandwidth allocation will be described as operating on packets, more generally, the techniques described herein may be applied to frames, cells, or other data units in a network device. Additionally, instead of receiving a complete packet at flow identification component 310, flow identification component 310 may only receive a header of the packet, a portion of the header, or some other data structure relating to the header of the packet. In this situation, the remainder of the packet may be stored in a different memory and then combined with an appropriate header before being transmitted.

Flow identification component 310 may identify flows for an incoming packet based on various types of information. In one implementation consistent with aspects described herein, such flow identification may be based on packet information such as source and destination addresses, source and destination ports, and type of protocol associated with the packet or data unit. Flow identification may be performed based on one or more flow tables 340 associated with device 100/110.

In one implementation, a flow may be represented as a set of nodes, with each node including at least 1.) an address of an associated encapsulation list 240 and 2.) a number of active entries in encapsulation list 240. For example, each node could be tree lookup result (matching a flow), a TCAM result, etc.

The node information associated with a packet's flow may then be used by encapsulation component 320 to (among other processing) identify member link addresses (e.g., physical MAC (media access control) addresses) for each member link 115 in aggregate interface 120. Load balancing component 330 may then determine which member link 115 onto which to forward the received packet based on a load balancing algorithm and, optionally, the node information (e.g., the number of active links in the aggregate interface).

As described above, it is desirable to ensure that only active member links 115 are identified in encapsulation list 240, thereby preventing forwarding of data to an inactive link. Known methodologies for meeting this requirement include dynamically updating all encapsulation lists 240 that include the inactive member link 115, as well as updating all node information relating to the associated aggregate list to reference the reduced number of active links. The time and processing/memory resources required to perform this process has been found to be unacceptable. As flow descriptions grow to include a larger number of nodes, the time taken to update this node information in the event of a member link failure or other down event grows proportionately.

In one implementation consistent with aspects described herein, member link down event component 350 may be configured to update encapsulation lists 240 to remove reference to an inactive link in the event of an active member link failure or other down event. Subsequent processing by encapsulation component 320 then references an update encapsulation list 240.

In accordance with one embodiment, the detrimental effects of updating the node information for each flow may be remedied by replacing the inactive member link 115 in each encapsulation list 240 with an active member link 115. By replacing an address (e.g., a MAC address) of an inactive link with an address for one of the active links, node information associated with the packet flows need not be updated, resulting in a significant time savings.

In one implementation, the selection of the active member link 115 may be arbitrary, thereby further reducing computational processing required during member link down event handling. In an alternative implementation, an active member link 115 may be identified based on a traffic load statistics among the available active links 115, to ensure that load balancing remains as evenly distributed as possible.

Figure 4:
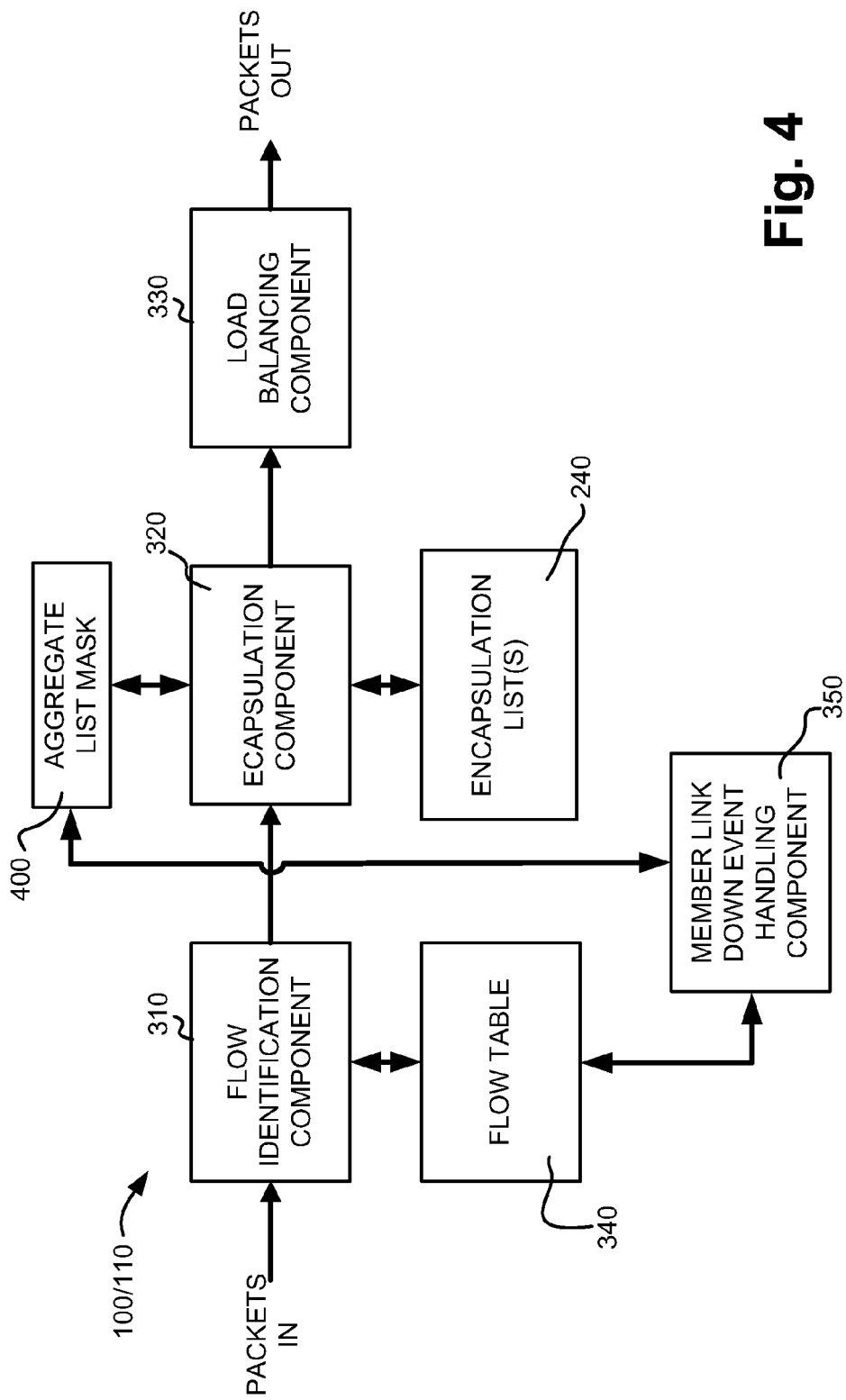
FIG. 4 is a diagram conceptually illustrating additional exemplary components for balancing load between member links in the aggregated interface of FIG. 1.

FIG. 4 is a diagram conceptually illustrating additional exemplary components for balancing load between member links 115 in aggregated interface 120. As with the elements shown in FIG. 3, the elements shown in FIG. 4 may be implemented in, for example, a router, switch or other network device, such as within a PFE 220.

As shown in FIG. 4, the device 100/110 may include flow identification component 310, encapsulation component 320, load balancing component 330, flow table 340, member link down event handling component 350, and an aggregate list mask 400. Aggregate list mask 400 may include information designating which links in an aggregate interface are active and which are inactive. As described above in relation to FIG. 3, flow identification component 310 may identify flows for an incoming packet based on various types of information, such as source and destination addresses, source and destination ports, and type of protocol associated with the packet or data unit.

In one implementation, a flow may be represented as a set of nodes, with each node including at least 1.) an encapsulation list address and 2.) an aggregate list mask address. Upon retrieval of flow information, encapsulation component 320 retrieves the aggregate mask 400 and the encapsulation list 240. Member link addresses (e.g., physical MAC addresses) for each active member link 115 in aggregate interface 120 may then be extracted from encapsulation list 240 based on aggregate list mask 400.

In one exemplary implementation, aggregate mask 400 may include a bit map structure of a predetermined size (e.g., 16 bits, 32 bits, 64 bits, etc.) configured to indicate which links in an aggregate interface are active. For example, assume that an aggregate interface 120 includes five links 115, with only links 1, 3, and 5 active. Further assume that the aggregate list mask 400 associated with the aggregate interface 120 is a 16 bit bitmap. In this example, aggregate list mask may be represented as "1010100000000000", with the 1's in bits 1, 3, and 5 indicating active links and the 0's in bits 2, 4, and 6-16. Upon retrieval of aggregate list mask 400, encapsulation component 320 may easily determine which links referenced by the identified encapsulation list are active. Encapsulation component 320 may then perform encapsulation and forward the packet to load balancing component 330 for delivery to one of the active links 115.

Load balancing component 330 may then determine which member link 115 onto which to forward the received packet based on a load balancing algorithm and, optionally, the node information (e.g., the number of active links in the aggregate interface).

Exemplary Processing

FIG. 5 is a flow diagram illustrating one exemplary set of acts that may be performed in responding to a member link down event in one of links 115 of aggregate interface 120. Processing may begin upon identification of the member link down event (act 500). Such identification may occur in response to a link failure, or as a result of manual removal of a link 115 from aggregate interface 120. Once a member link down event is identified, the link or links 115 affected may be identified (act 505).

One or more encapsulation or aggregation lists referencing the aggregate interface may be identified (act 510). As described above, multiple encapsulation lists 240 may point to each aggregate interface 120, depending on encapsulation requirements for different packet flows. Each encapsulation list may include physical addresses (e.g., MAC addresses) associated with the member links 115 in the respective aggregate interface 120.

Upon identification of any involved encapsulation lists, the addresses for the inactive links 115 identified in act 505 may be removed and replaced with addresses for active links 115 (act 515). In this manner, subsequent retrieval of the encapsulation lists upon packet receipt will not result in forwarding of any data to an inactive link.

FIG. 6 is a flow illustrating one exemplary set of acts that may be performed in responding to a member link down event in one of links 115 of aggregate interface 120. Processing may begin upon identification of the member link down event by member link down event handling component 350 (act 600). Such identification may occur in response to a link failure, or as a result of manual removal of a link 115 from aggregate interface 120. Once a member link down event is identified, the link or links 115 affected may be identified (act 605). In an alternative embodiment, processing may begin upon re-activation of a member link 115, rather than removal or de-activation of a link 115.

Aggregate list mask 400 associated with the aggregate interface 120 may be retrieved (act 610). As described above, an aggregate list mask 400 may be associated with each aggregate interface 120 and may include link state identifiers that represent a current state of each member link 115 in interface 120. For example, aggregate list mask 400 may include a number of bits, where each bit represents whether a member link 115 in interface 120 is active or inactive.

Link state identifiers in aggregate list mask 400 associated with the inactive links identified in act 605 may be modified to reflect the inactive state of the identified links (act 615). Subsequent packet forwarding requests intended for aggregate interface 120 may initially retrieve aggregate list mask 400 for identification of the active links 115 in aggregate interface 120.

FIG. 7 is a flow diagram illustrating one exemplary set of acts that may be performed in forwarding packets on aggregate interface 120. Processing may begin upon receipt of a packet or other data unit for forwarding on one of member links 115 of aggregate interface 120 (act 700). A flow associated with the packet may be identified (act 705). As described above, a flow associated with a packet may include a set of nodes including an applicable encapsulation list 240 address and an aggregate list mask 400 address.

Aggregate list mask 400 may be retrieved from aggregate list mask address (act 710). As described above, aggregate list mask 400 may be dynamically updated in response to member link down events (as well as re-activation events) to reflect a current state of each member link 115 in aggregate interface 120. Active links 115 in aggregate interface 120 may be identified based on aggregate list mask 400 (act 715). The received packet may then be encapsulated and forwarded on one of active links 115 (act 720). As described above, one or more encapsulation lists 240 may be associated with each aggregate interface 120. Because encapsulation lists are identified by a packet's flow, subsequent packet processing based on any relevant encapsulation list may similarly reference aggregate list mask 400.

By enabling efficient and dynamic removal of inactive links from use in packet forwarding engines, data loss in handing member link down events may be significantly reduced.

CONCLUSION

The foregoing description of exemplary embodiments of the invention provides illustration and description, but is not intended to be exhaustive or to limit the invention to the precise form disclosed. Modifications and variations are possible in light of the above teachings or may be acquired from practice of the invention.

For example, while a series of acts have been described with regard to FIG. 5-7, the order of the acts may be varied in other implementations consistent with the invention. Moreover, non-dependent acts may be implemented in parallel.

It will also be apparent to one of ordinary skill in the art that aspects of the invention, as described above, may be implemented in many different forms of network topologies, software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method, comprising:
   establishing a respective encapsulation list for each of a plurality of aggregate interfaces of a network device, each of the encapsulation lists specifying addresses for a plurality of member links of the respective aggregate interface, wherein at least one of the encapsulation lists specifies addresses for member links different from members links specified by others of the plurality of encapsulation lists;
   associating a plurality of masks with the plurality of encapsulation lists of the aggregate interfaces, wherein each of the plurality of masks corresponds to one of the plurality of encapsulation lists, and wherein each of the plurality of masks identifies a current state of each member link in the corresponding aggregate interface, and wherein the current state comprises one of an inactive state and an active state;
   receiving a data unit;
   selecting an aggregate interface of the plurality of aggregate interfaces for forwarding the data unit;
   identifying the encapsulation list for the selected aggregate interface; and
   selecting the mask that corresponds to the identified encapsulation list;
   determining active member links in the identified encapsulation list of the selected aggregate interface by identifying active member link addresses in the encapsulation list based on the selected mask; and
   forwarding the data unit on one of the active member links.

2. The method of claim 1, wherein each of the plurality of masks is a bit map indicating the state of each member link in the corresponding aggregate interface as a bit value.

3. The method of claim 2, wherein each of the plurality of the aggregate interface includes 16 member links and the corresponding mask comprises a 16 bit mask.

4. The method of claim 2, wherein identifying active member link addresses in the encapsulation list based on the mask comprises determining link addresses in the encapsulation list corresponding to bit values corresponding to an active status.

5. The method of claim 1, further comprising:
   identifying a change in state of a member link in one of the plurality of the aggregate interfaces; and
   modifying the mask corresponding to the one of the plurality of the aggregate interfaces to reflect the change in state of the member link.

6. The method of claim 1, wherein the change in state comprises a member link down event.

7. A network device comprising:
   a packet forwarding engine circuitry configured to receive a data unit for forwarding on one of a plurality of aggregate interfaces, wherein each of the plurality of the aggregate interfaces comprises a set of member links, wherein each of the sets of member links includes member links different from members links of other sets of member links;
   an encapsulation component configured to retrieve, from a plurality of encapsulation lists, an encapsulation list associated with the data unit, wherein the encapsulation list includes addresses associated with the member links in the one of the plurality of the aggregate interfaces, and wherein each of the plurality of encapsulation lists corresponds to one of the plurality of aggregate interfaces;
   the encapsulation component further configured to retrieve a mask associated with the one of the plurality of the aggregate interfaces, the mask identifying a current state of each member link in the one of the plurality of the aggregate interfaces;
   the encapsulation component further configured to identify an active member link in the one of the plurality of the aggregate interfaces based on the mask; and a load balancing component configured to forward the data unit on the identified active member link.

8. The network device of claim 7, wherein the addresses associated with the member links in the one of the plurality of the aggregate interfaces comprise physical addresses.

9. The network device of claim 7, wherein the addresses associated with the member links in the one of the plurality of the aggregate interface comprise media access control (MAC) addresses.

10. The network device of claim 7, wherein the load balancing component is further configured to:
   balance a load on the active member links based on a load balancing algorithm.

11. The network device of claim 7, further comprising:
   a state change handling component configured to modify the mask associated with the one of the plurality of the aggregate interfaces when a member link has changed from an active state to an inactive state.

12. A network device, comprising:
   logic configured to:
      receive a packet;
      identify a flow associated with the packet,
         wherein the flow designates a plurality of mask addresses and a plurality of list addresses each of which associated with one of a plurality of aggregate interfaces, wherein at least one of the list addresses specifies addresses for member links of the one of the plurality of aggregate interfaces different from members links specified by others of the plurality of list of addresses;
      retrieve a mask from the plurality of mask addresses that includes state identifiers indicating a current state of each member link in the one of the plurality of the aggregate interfaces;
      retrieve a list from the plurality of the list addresses based on the retrieved mask, wherein the list includes addresses for active links identified in the retrieved mask; and
      forward the packet to an active link address identified in the list.

13. The network device of claim 12, wherein the logic is further configured to:
   determine whether a link state of a member link has changed; and
   modify the retrieved mask when the link state of a member link has changed.

* * * * *